(12) United States Patent
Lou et al.

(10) Patent No.: US 10,912,116 B2
(45) Date of Patent: Feb. 2, 2021

(54) RESOURCE ALLOCATION METHOD, TERMINAL, APPARATUS AND SYSTEM

(71) Applicant: Huawei Technologies Co., Ltd., Shenzhen (CN)

(72) Inventors: Chong Lou, Shanghai (CN); Xing Liu, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/400,778

(22) Filed: May 1, 2019

(65) Prior Publication Data
US 2019/0261408 A1 Aug. 22, 2019

Related U.S. Application Data

(63) Continuation of application No. PCT/CN2017/107954, filed on Oct. 27, 2017.

(30) Foreign Application Priority Data

Nov. 1, 2016 (CN) .......................... 2016 1 0936349

(51) Int. Cl.
*H04W 72/14* (2009.01)
*H04W 72/04* (2009.01)
(Continued)

(52) U.S. Cl.
CPC ........... *H04W 72/14* (2013.01); *H04W 72/04* (2013.01); *H04W 72/10* (2013.01); *H04W 72/12* (2013.01); *H04W 72/1284* (2013.01)

(58) Field of Classification Search
CPC ..... H04W 72/14; H04W 72/04; H04W 72/10; H04W 72/12; H04W 72/1284
See application file for complete search history.

(56) References Cited

U.S. PATENT DOCUMENTS 9,019,926 B2 4/2015 Yi et al.
2010/0046456 A1 2/2010 Yi et al.
(Continued)

FOREIGN PATENT DOCUMENTS

CN 101606336 A 12/2009
CN 104144484 A 11/2014
(Continued)

OTHER PUBLICATIONS

"Enhancement of LCP for Supporting Multiple Numerologies in NR," 3GPP TSG-RAN WG2 #95bis, Kaohsiung, Taiwan, R2-166469, pp. 1-7, 3rd Generation Partnership Project, Valbonne, France (Oct. 10-14, 2016).
(Continued)

*Primary Examiner* — Ronald B Abelson
(74) *Attorney, Agent, or Firm* — Leydig, Voit & Mayer, Ltd.

(57) ABSTRACT

A resource allocation method, a terminal and an apparatus are provided. A terminal receives an uplink scheduling grant indicating an uplink resource corresponding to a first radio interface technology from an access network device; selects a logical channel set from logical channels of a terminal, where the logical channel set is a set of logical channels on which to-be-sent data exists and that correspond to the first radio interface technology, and the first radio interface technology is one of at least one radio interface technology, or a radio interface technology specified by the access network device in the at least one radio interface technology; and maps, based on a priority and a prioritized bit rate that are of each logical channel in the logical channel set and corresponding to the first radio interface technology, to-be-sent data corresponding to the logical channel set onto the uplink resource.

25 Claims, 7 Drawing Sheets

(51) Int. Cl.
*H04W 72/10* (2009.01)
*H04W 72/12* (2009.01)

(56) References Cited

U.S. PATENT DOCUMENTS

| | | | |
|---|---|---|---|
| 2013/0088983 A1 | 4/2013 | Pragada et al. | |
| 2014/0321376 A1 | 10/2014 | Damnjanovic et al. | |
| 2016/0142934 A1* | 5/2016 | Ahmadzadeh | H04W 28/02 |
| 2016/0205699 A1 | 7/2016 | Uchino et al. | |
| 2017/0085452 A1* | 3/2017 | Kato | H04L 12/26 |

FOREIGN PATENT DOCUMENTS

| | | |
|---|---|---|
| CN | 105165095 A | 12/2015 |
| CN | 105474727 A | 4/2016 |
| CN | 105684516 A | 6/2016 |
| EP | 2244514 A1 | 10/2010 |
| EP | 2429251 B1 | 9/2013 |
| EP | 2854444 A1 | 4/2015 |
| JP | 2016529854 A | 9/2016 |
| KR | 20150034586 A | 4/2015 |
| WO | 2011019204 A2 | 2/2011 |
| WO | 2014181176 A1 | 11/2014 |
| WO | 2015046787 A1 | 4/2015 |
| WO | 2015141682 A1 | 9/2015 |
| WO | 2016163660 A1 | 10/2016 |
| WO | 2016163663 A1 | 10/2016 |

OTHER PUBLICATIONS

"LCP with Multiple Numerologies," 3GPP TSG RAN WG2 #96, Reno, Nevada, R2-167575, pp. 1-4, 3rd Generation Partnership Project, Valbonne, France (Nov. 14-18, 2016).

"Considerations on Qos control and UL transmission on LAA SCell," 3GPP TSG-RAN WG2 Meeting #93bis, Dubrovnik, Croatia, R2-162429, pp. 1-5, 3rd Generation Pamership Project, Valbonne, France (Apr. 11-15, 2016).

"Uplink QoS support for LAA," 3GPP TSG-RAN WG2 #93bis, Dubrovnik, Croatia, R2-152469, pp. 1-5, 3rd Generation Parnership Project, Valbonne, France (Apr. 11-15, 2016).

* cited by examiner

RESOURCE ALLOCATION METHOD, TERMINAL, APPARATUS AND SYSTEM

CROSS-REFERENCE TO RELATED APPLICATIONS

This application is a continuation of International Application No. PCT/CN2017/107954, filed on Oct. 27, 2017, which claims priority to Chinese Patent Application No. 201610936349.5, filed on Nov. 1, 2016. The disclosures of the aforementioned applications are hereby incorporated by reference in their entireties.

TECHNICAL FIELD

Embodiments of the present disclosure relate to the field of communications technologies, and in particular, to a resource allocation method and a terminal.

BACKGROUND

A radio interface technology (RIT) is generally referred to as numerology, such as a Long Term Evolution (LTE) technology, and may include a multiple access manner, a modulation and coding scheme (MCS), a frame structure, a physical channel, a transport channel, a logical channel (LCH), medium access control (MAC), radio link control (RLC), the packet data convergence protocol (PDCP), radio resource control (RRC), and the like.

In an LTE system, because a terminal has a plurality of service requirements, an access network device configures a plurality of LCHs for the terminal. When the terminal needs to transmit data to the access network device, the access network device allocates a communication channel to the terminal. Therefore, when to-be-transmitted data exists on the plurality of LCHs, the data on the plurality of LCHs needs to be mapped onto the communication channel. Currently, a common resource allocation method is: A priority is configured for each LCH, data on an LCH having a high priority is first mapped onto the communication channel, until the communication channel is full or no data needs to be transmitted. However, in the foregoing manner, because the LCH having the high priority always occupies the communication channel, an LCH having a low priority has no resource to occupy, thereby lowering resource allocation balance.

SUMMARY

Embodiments of the present disclosure disclose a resource allocation method and a terminal, to improve resource allocation balance.

According to a first aspect, a resource allocation method is disclosed. The method is applied to a terminal, and includes: receiving an uplink scheduling grant that is sent by an access network device and that includes a transport block corresponding to at least one radio interface technology, selecting a logical channel set from LCHs of the terminal, and mapping, based on a priority and a prioritized bit rate (PBR) that are of each LCH in the logical channel set and corresponding to a first radio interface technology, to-be-sent data corresponding to the logical channel set onto a transport block corresponding to the first radio interface technology, or in other words, sequentially mapping, based on a priority of each LCH in the logical channel set, some data that is in to-be-sent data on the each LCH and that meets a PBR corresponding to a first radio interface technology onto a transport block corresponding to the first radio interface technology, instead of sequentially mapping, based on the priority of each LCH in the logical channel set, all the to-be-sent data on the each LCH onto the transport block corresponding to the first radio interface technology, so that a probability that data on an LCH having a low priority is transmitted can be increased, to improve resource allocation balance. The logical channel set is a set of LCHs on which to-be-sent data exists and that correspond to the first radio interface technology, and the first radio interface technology is any one of the at least one radio interface technology, or a radio interface technology specified by the access network device in the at least one radio interface technology, or a radio interface technology having a highest priority in the at least one radio interface technology.

In an embodiment, the logical channel set may include a first logical channel subset and a second logical channel subset, a $1^{st}$ radio interface technology of each LCH in the first logical channel subset is the first radio interface technology, and a $2^{nd}$ radio interface technology of each LCH in the second logical channel subset is the first radio interface technology. Because a priority of an LCH using the first radio interface technology as a $1^{st}$ radio interface technology is always higher than that of an LCH using the first radio interface technology as a $2^{nd}$ radio interface technology, to-be-sent data on each LCH in the first logical channel subset may be first mapped, based on a priority and a PBR that are of the each LCH and corresponding to the first radio interface technology, onto the transport block corresponding to the first radio interface technology, to improve resource allocation balance on the LCH using the first radio interface technology as the $1^{st}$ radio interface technology.

In an embodiment, the uplink scheduling grant may further include a capacity and a transmission time of the transport block corresponding to the at least one radio interface technology. When a first capacity is greater than a second capacity, after the to-be-sent data on each LCH in the first logical channel subset is mapped based on the priority and the PBR, remaining to-be-sent data on each LCH on which the remaining to-be-sent data exists in the first logical channel subset may be mapped, based on a priority that is of the each LCH and corresponding to the first radio interface technology, onto the transport block corresponding to the first radio interface technology. Then, when the first capacity is greater than a third capacity, or in other words, when a capacity of the transport block corresponding to the first radio interface technology is greater than a sum of capacities of to-be-sent data on all the LCHs in the first logical channel subset, to-be-sent data on each LCH in the second logical channel subset may be mapped, based on a priority and a PBR that are of the each LCH and corresponding to the first radio interface technology, onto the transport block corresponding to the first radio interface technology, to ensure radio resource utilization while improving resource allocation balance on the LCH using the first radio interface technology as the $1^{st}$ radio interface technology. The first capacity is the capacity of the transport block corresponding to the first radio interface technology, the second capacity is a product of a time length of a transmission time of the first radio interface technology and a sum of PBRs that are of all the LCHs in the first logical channel subset and corresponding to the first radio interface technology, and the third capacity is the sum of the capacities of the to-be-sent data on all the LCHs in the first logical channel subset.

In an embodiment, the uplink scheduling grant may further include the capacity and the transmission time of the transport block corresponding to the at least one radio interface technology. When the first capacity is greater than the second capacity, the to-be-sent data on each LCH in the second logical channel subset may be mapped, based on the priority and the PBR that are of the each LCH and corresponding to the first radio interface technology, onto the transport block corresponding to the first radio interface technology. When the first capacity is greater than a fourth capacity, the remaining to-be-sent data on each LCH on which the remaining to-be-sent data exists in the first logical channel subset may be mapped, based on the priority that is of the each LCH and corresponding to the first radio interface technology, onto the transport block corresponding to the first radio interface technology, to ensure radio resource utilization while improving resource allocation balance on the LCH using the first radio interface technology as the $1^{st}$ radio interface technology. The fourth capacity is a sum of a first product and the second capacity, and the first product is a product of the time length of the transmission time of the first radio interface technology and a sum of PBRs that are of all the LCHs in the second logical channel subset and corresponding to the first radio interface technology.

In an embodiment, the uplink scheduling grant may further include the capacity and the transmission time of the transport block corresponding to the at least one radio interface technology. When the first capacity is greater than the second capacity, to-be-sent data on each LCH in a first logical channel group may be mapped, based on a priority and a PBR that are of the each LCH and corresponding to the first radio interface technology, onto the transport block corresponding to the first radio interface technology. Then, when the first capacity is greater than a fifth capacity, the remaining to-be-sent data on each LCH on which the remaining to-be-sent data exists in the first logical channel subset may be mapped, based on the priority that is of the each LCH and corresponding to the first radio interface technology, onto the transport block corresponding to the first radio interface technology. Then, when the first capacity is greater than a sixth capacity, to-be-sent data on each LCH in a second logical channel group may be mapped, based on a priority and a PBR that are of the each LCH and corresponding to the first radio interface technology, onto the transport block corresponding to the first radio interface technology, to ensure radio resource utilization while improving resource allocation balance on the LCH using the first radio interface technology as the $1^{st}$ radio interface technology. The first logical channel group is a group of LCHs having a preset parameter in the second logical channel subset, and the second logical channel group is a group of LCHs, other than the LCHs included in the first logical channel group, in the second logical channel subset. The fifth capacity is a sum of the second capacity and a second product, the second product is a product of the time length of the transmission time of the first radio interface technology and a sum of PBRs that are of all the LCHs in the first logical channel group and corresponding to the first radio interface technology, and the sixth capacity is a product of the time length of the transmission time of the first radio interface technology and the sum of the PBRs that are of all the LCHs in the second logical channel subset and corresponding to the first radio interface technology.

In an embodiment, when the first capacity is greater than a seventh capacity, or the first capacity is greater than an eighth capacity, remaining to-be-sent data on each LCH on which the remaining to-be-sent data exists in the second logical channel subset may be mapped, based on a priority that is of the each LCH and corresponding to the first radio interface technology, onto the transport block corresponding to the first radio interface technology, to further improve radio resource utilization. The seventh capacity is a sum of the third capacity and the first product, and the eighth capacity is a sum of the third capacity and the sixth capacity.

In an embodiment, the logical channel set may include a first logical channel subset and a second logical channel subset, a $1^{st}$ radio interface technology of each LCH in the first logical channel subset is the first radio interface technology, a $2^{nd}$ radio interface technology of each LCH in the first logical channel subset is a second radio interface technology, a $1^{st}$ radio interface technology of each LCH in the second logical channel subset is the second radio interface technology, a $2^{nd}$ radio interface technology of each LCH in the second logical channel subset is the first radio interface technology, and a transmission time interval (TTI) of the first radio interface technology is greater than a TTI of the second radio interface technology. To-be-sent data on each LCH in the first logical channel subset may be mapped, based on a priority and a PBR that are of the each LCH and corresponding to the first radio interface technology, onto the transport block corresponding to the first radio interface technology. When first data that has been transmitted by using the transport block corresponding to the first radio interface technology exists in to-be-sent data corresponding to the second logical channel subset, and a message that is sent by the access network device and that is used to indicate that the first data is successfully transmitted is not received, the first data may be mapped onto a transport block corresponding to the second radio interface technology. This can increase a success rate of data transmission having a relatively small TTI.

In an embodiment, the logical channel set may include a first logical channel subset and a second logical channel subset, a $1^{st}$ radio interface technology of each LCH in the first logical channel subset is the first radio interface technology, a $2^{nd}$ radio interface technology of each LCH in the first logical channel subset is a second radio interface technology, a $1^{st}$ radio interface technology of each LCH in the second logical channel subset is the second radio interface technology, and a $2^{nd}$ radio interface technology of each LCH in the second logical channel subset is the first radio interface technology. When a message that is sent by the access network device and that is used to indicate that second data on the second logical channel subset is unsuccessfully transmitted on the transport block corresponding to the first radio interface technology is received before a transport block corresponding to the second radio interface technology is transmitted, the second data may be mapped onto the transport block corresponding to the second radio interface technology, to ensure that data needing to be retransmitted is transmitted by using a low-latency resource, so that data retransmission efficiency can be improved.

According to a second aspect, a terminal is disclosed. The terminal includes units configured to perform the resource allocation method provided in the first aspect or any possible implementation of the first aspect.

According to a third aspect, a terminal is disclosed. The terminal includes a processor, a memory, and a transceiver, where the transceiver is configured to receive an uplink scheduling grant sent by an access network device, where the uplink scheduling grant includes a transport block corresponding to at least one radio interface technology; and the memory stores a set of program code, and the processor is configured to invoke the program code stored in the memory to perform the following operations:

selecting a logical channel set from LCHs of the terminal, where the logical channel set is a set of LCHs on which to-be-sent data exists and that correspond to a first radio interface technology, and the first radio interface technology is any one of the at least one radio interface technology, or a radio interface technology specified by the access network device in the at least one radio interface technology; and mapping, based on a priority and a PBR that are of each LCH in the logical channel set and corresponding to the first radio interface technology, to-be-sent data corresponding to the logical channel set onto a transport block corresponding to the first radio interface technology.

A fourth aspect discloses a readable storage medium. The readable storage medium stores program code used by a terminal to perform the resource allocation method provided in the first aspect or any possible implementation of the first aspect.

BRIEF DESCRIPTION OF DRAWINGS

To help in describing technical solutions in embodiments of the present disclosure, the following briefly describes the accompanying drawings used for describing the embodiments. The accompanying drawings in the following description show merely some embodiments of the present disclosure, and a person of ordinary skill in the art may derive other drawings from these accompanying drawings without creative efforts.

DESCRIPTION OF EMBODIMENTS

Figure 1:
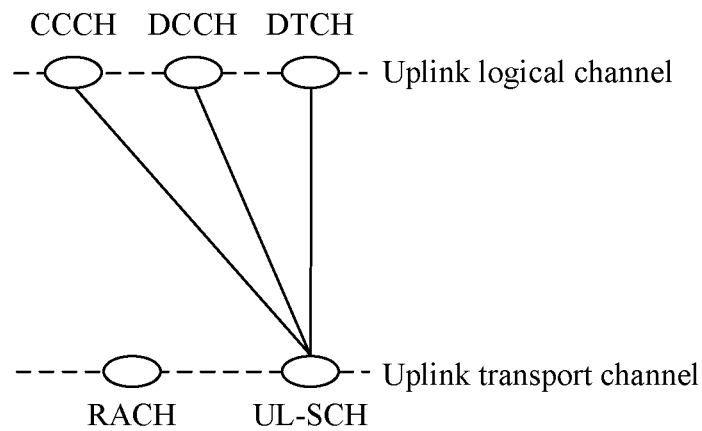
FIG. 1 is a schematic diagram of multiplexing a plurality of LCHs onto one transport channel according to an embodiment of the present disclosure.

The following clearly describes technical solutions in embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure disclose a resource allocation method and a terminal, to improve resource allocation balance. The resource allocation method and the terminal are separately described below in detail.

For better understanding of the resource allocation method and the terminal disclosed in the embodiments of the present disclosure, application scenarios and some concepts in the embodiments of the present disclosure are first described below. Common multiple access manners include manners such as time division multiple access (TDMA), frequency division multiple access (FDMA), code division multiple access (CDMA), orthogonal frequency division multiple access (OFDMA), and single carrier frequency division multiple access (SC-FDMA). A frame structure generally refers to a format and a corresponding parameter of data transmitted at a physical layer. Different wireless communications systems usually use frame structure designs specific to the wireless communications systems. For example, frame structures of a 3rd Generation Partnership Project (3GPP) LTE system include a type I frame structure used for frequency division multiplexing (FDM) and a type II frame structure used for time division multiplexing (TDM). The two types of frame structures each include 10 subframes having a length of 1 ms. A main difference between the type II frame structure and the type I frame structure is that a special subframe is introduced into the type II frame structure. The special subframe includes three special timeslots: a downlink pilot timeslot (DwPTS), a guard period (GP), and an uplink pilot timeslot (UpPTS). The DwPTS is always used for downlink sending. The UpPTS is always used for uplink sending. The GP is a guard interval for switching from downlink to uplink. The subframes in the type I frame structure are classified into a downlink subframe and an uplink subframe based on different frequency ranges, and both the downlink subframe and the uplink subframe can be used in any TTI. The subframes in the type II frame structure are classified into an uplink subframe and a downlink subframe, and only the downlink subframe or the uplink subframe can be used in any TTI. A time length of one TTI is equal to a time length of one subframe.

On one carrier, the LTE system usually supports only one radio interface technology, for example, supports only one multiple access manner, or supports only one frame structure. A same radio interface technology on a carrier supports services having various quality of service (QoS), for example, supports a guaranteed bit rate (GBR) service and a non-guaranteed bit rate (Non-GBR) service. A same radio interface technology used on a same carrier supports a mobile broadband (MBB) service and machine-to-machine (M2M) communication. Some optimized solutions may be used for M2M communication. For example, an extended access barring (EAB) mechanism is introduced into the delay tolerant M2M service, so that when a network is congested or overloaded, some M2M terminals are temporarily prevented from accessing the network.

In the LTE system, an access network device configures at least one LCH for a terminal due to a plurality of service requirements. Each LCH corresponds to a quality of service (QoS) requirement of one service. For example, if the terminal needs both an Internet access service and a voice over LTE (VoLTE) service, two different LCHs are configured for the terminal, to separately establish independent entities at a PDCP layer and an RLC layer for processing. A MAC layer is responsible for multiplexing a plurality of logical channels onto a same transport channel. The terminal can send only one MAC protocol data unit (PDU) in each TTI of each carrier.

Uplink data transmission of the terminal is controlled by the access network device. A radio resource allocation mechanism is mainly as follows: The terminal may notify, by using a scheduling request and a buffer status report, the access network device that the terminal has to-be-sent uplink data, to obtain an uplink scheduling grant and then initiate a logical channel prioritization (LCP) process. The access network device sends the uplink scheduling grant to the corresponding terminal. The uplink scheduling grant is used to indicate a location of a radio resource to be used by the terminal, a modulation and coding scheme, an amount of to-be-transmitted data, and the like. When the terminal receives an uplink scheduling grant indicating that the terminal needs to initiate a new uplink data transmission, the terminal needs to add RLC PDUs from a plurality of LCHs into a same MAC PDU. In this case, MAC multiplexing and LCP processing are required. FIG. 1 is a schematic diagram of multiplexing a plurality of LCHs onto one transport channel according to an embodiment of the present disclosure. As shown in FIG. 1, a plurality of LCHs may be multiplexed onto a same transport channel.

However, there is only one MAC PDU, but a plurality of LCHs need to be multiplexed. Therefore, a priority is allocated to each LCH. Data on an LCH having a highest priority is first included in the MAC PDU, then data on an LCH having a second highest priority is included in the MAC PDU, and by analogy, data is included until the allocated MAC PDU is full or no more data needs to be sent. The priority of each LCH is determined at an RRC layer by using a priority field of a logical channel configuration of an information element (IE) in an RRC message, and a smaller value indicates a higher priority. However, in such an allocation manner, an LCH having a high priority may always occupy a radio resource allocated by an eNodeB to the terminal, and consequently an LCH having a low priority has no resource to occupy.

To avoid the foregoing case, a PBR concept is introduced into the LTE system. To be specific, before resources are allocated to LCHs, data rates of the LCHs are configured, to ensure a minimum data rate for each LCH, and avoid a case in which an LCH having a low priority has no resource to occupy. The PBR is determined by using a PBR field of the LCH configuration.

To support, on a same carrier, various services that differ greatly in QoS requirements and/or radio condition requirements, it is proposed in a 5G system that an access network device and a terminal each can use at least one radio interface technology on a continuous spectrum or a plurality of carriers through FDM or TDM. For example, the terminal may support both a long TTI (1 ms) and a short TTI (0.2 ms). The long TTI is mainly used for a service having large bandwidth and high rate requirements. The short TTI may be mainly used for a service having a relatively strict latency requirement.

In the 5G system, an LCH may be flexibly mapped to at least one radio interface technology, at least one LCH may be located on a same carrier or different carriers, and coordinated operations are performed in a carrier aggregation (CA) or dual connectivity (DC) manner. Because the access network device can determine a mapping relationship between an uplink/downlink LCH and a radio interface technology, a new challenge is posed to a related function, such as an LCP process, of an existing MAC layer. When an uplink scheduling grant received by the terminal indicates a new data transmission, the uplink scheduling grant may indicate a radio interface technology that needs to be used by the terminal to send data. When an LCH may be mapped to a plurality of radio interface technologies, an existing radio resource allocation technology cannot resolve a problem of radio resource allocation in such a scenario.

Figure 2:
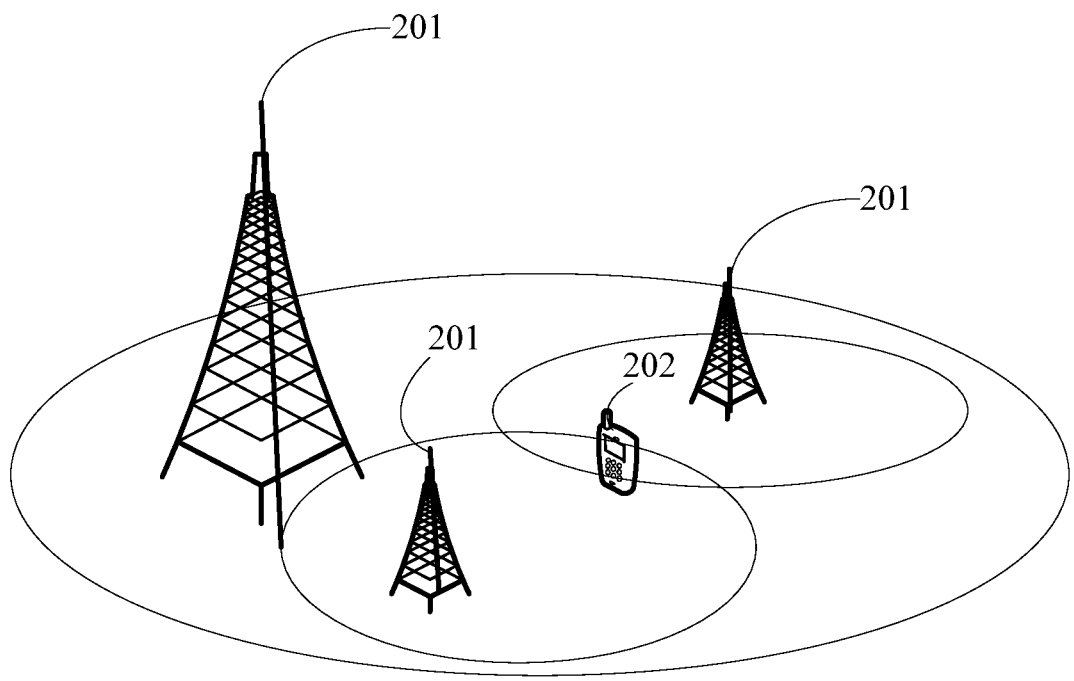
FIG. 2 is a schematic diagram of a network architecture according to an embodiment of the present disclosure.

For better understanding of the resource allocation method and the terminal disclosed in the embodiments of the present disclosure, a network architecture used in the embodiments of the present disclosure is first described below. FIG. 2 is a schematic diagram of a network architecture according to an embodiment of the present disclosure. As shown in FIG. 2, the network architecture may include at least one radio access network device 201 and a terminal 202. The terminal 202 is located in a coverage area of at least one cell (carrier) provided by the radio access network device 201. When the terminal 202 is located in coverage areas of at least two cells (carrier) provided by the radio access network device(s) 201, or in other words, when a plurality of cells serve the terminal 202, the terminal 202 may operate in a CA, DC, or coordinated multipoint transmission/reception (CoMP) manner. The at least one cell provides at least one radio interface technology each of which provides a radio resource for the terminal 202. The terminal 202 is configured to send a radio resource request to the radio access network device 201. The access network device 201 is configured to send an uplink scheduling grant to the terminal 202. The terminal 202 is further configured to transmit data to the radio access network device 201 based on a radio resource allocated by the access network device 201. The radio access network device 201 may be a base station, an evolved NodeB (eNB), an access point (AP), or the like. The terminal 202 may be a mobile terminal, a sensor having a network access function, or the like. The present disclosure is also applicable to a universal mobile telecommunications system (UMTS), a CDMA system, a wireless local area network (WLAN), a future 5G (the fifth generation) wireless communications system, or the like.

Figure 3:
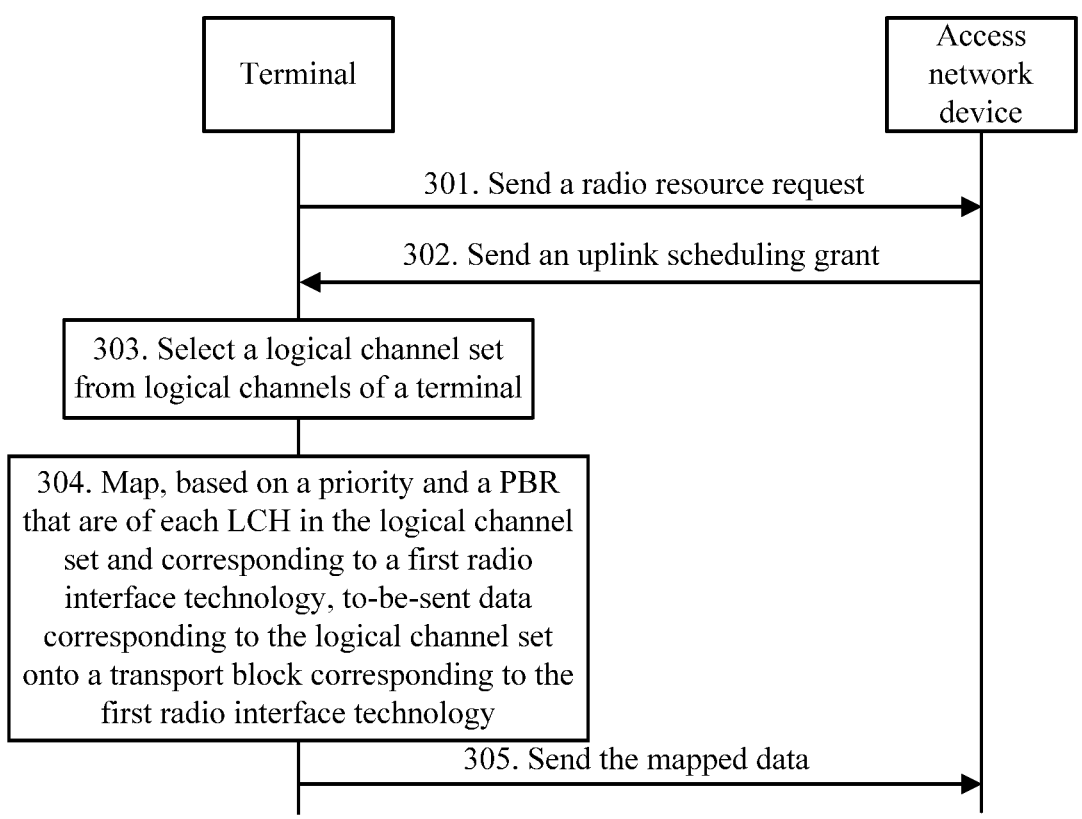
FIG. 3 is a schematic flowchart of a resource allocation method according to an embodiment of the present disclosure.

Based on the network architecture shown in FIG. 2, FIG. 3 is a schematic flowchart of a resource allocation method according to an embodiment of the present disclosure. The resource allocation method shown in FIG. 3 is described from perspectives of the radio access network device 201 and the terminal 202. As shown in FIG. 3, the resource allocation method may include the following steps.

301. A terminal sends a radio resource request to a radio access network device.

In this embodiment, because uplink data transmission is controlled by the access network device, when the terminal has to-be-sent data, the terminal sends the radio resource request to the radio access network device to request, from the access network device, a radio resource used to transmit uplink data.

302. The radio access network device sends an uplink scheduling grant to the terminal.

In this embodiment, after receiving the radio resource request sent by the terminal, the radio access network device allocates a radio resource to the terminal, the allocated radio resource is sent to the terminal by using the uplink scheduling grant. The radio resource may include a transport block corresponding to at least one radio interface technology. The at least one radio interface technology is all or some radio interface technologies that can be provided by a cell in which the terminal is currently located.

303. The terminal selects a logical channel set from logical channels of the terminal.

In this embodiment, because the radio access network device configures more than one LCH for the terminal, and different LCHs may correspond to a same radio interface technology or different radio interface technologies, not data on all the LCHs of the terminal can be transmitted by using a transport block corresponding to one radio interface technology. Therefore, the terminal first needs to select the logical channel set from the LCHs of the terminal. The logical channel set is a set of LCHs on which to-be-sent data exists and that correspond to a first radio interface technology, namely, a set of LCHs on which to-be-sent data exists and the to-be-sent data can be transmitted by using a transport block corresponding to the first radio interface technology. The first radio interface technology may be any radio interface technology selected by the terminal from the at least one radio interface technology, or may be a radio interface technology specified by the access network device in the at least one radio interface technology, or may be a radio interface technology having a highest priority in the at least one radio interface technology.

304. The terminal maps, based on a priority and a PBR that are of each LCH in the logical channel set and corresponding to a first radio interface technology, to-be-sent data corresponding to the logical channel set onto a transport block corresponding to the first radio interface technology.

In this embodiment, because a same LCH may have different priorities in different radio interface technologies, after the terminal selects the logical channel set from the LCHs of the terminal, the terminal maps, based on the priority and the PBR that are of each LCH in the logical channel set and corresponding to the first radio interface technology, the to-be-sent data on the each LCH in the logical channel set onto the transport block corresponding to the first radio interface technology.

For example, the access network device configures logical channels: an LCH 1, an LCH 2, an LCH 3, an LCH 4, an LCH 5, and an LCH 6 for the terminal. The LCH 1, the LCH 2, and the LCH 3 can use the transport block corresponding to the first radio interface technology to transmit data, but cannot use a transport block corresponding to a second radio interface technology to transmit data. The LCH 4, the LCH 5, and the LCH 6 can use the transport block corresponding to the second radio interface technology to transmit data, but cannot use the transport block corresponding to the first radio interface technology to transmit data. Priorities that are of the LCH 1, the LCH 2, and the LCH 3 and corresponding to the first radio interface technology meet LCH 1>LCH 2>LCH 3. Priorities that are of the LCH 4, the LCH 5, and the LCH 6 and corresponding to the second radio interface technology meet LCH 4>LCH 5>LCH 6. The terminal may map, based on the priorities that are of the LCH 1, the LCH 2, and the LCH 3 and corresponding to the first radio interface technology and PBRs that are of the LCH 1, the LCH 2, and the LCH 3 and corresponding to the first radio interface technology, to-be-sent data on the LCH 1, the LCH 2, and the LCH 3 onto the transport block corresponding to the first radio interface technology. For example, when a time length of a transmission time of the transport block corresponding to the first radio interface technology is T, and the PBRs that are of the LCH 1, the LCH 2, and the LCH 3 and corresponding to the first radio interface technology are respectively a PBR 1, a PBR 2, and a PBR 3, some data having a PBR 1*T capacity in to-be-sent data on the LCH 1 may be first mapped onto the transport block corresponding to the first radio interface technology. Then, when the transport block corresponding to the first radio interface technology still has a remaining capacity, some data having a PBR 2*T capacity in to-be-sent data on the LCH 2 is mapped onto the transport block corresponding to the first radio interface technology. Then, when the transport block corresponding to the first radio interface technology still has a remaining capacity, some data having a PBR 3*T capacity in to-be-sent data on the LCH 3 is mapped onto the transport block corresponding to the first radio interface technology.

In this embodiment, the logical channel set may include a first logical channel subset and a second logical channel subset, a $1^{st}$ radio interface technology of the first logical channel subset is the first radio interface technology, and a $2^{nd}$ radio interface technology of the second logical channel subset is the first radio interface technology. Because a priority of an LCH corresponding to the $1^{st}$ radio interface technology is always higher than a priority of an LCH corresponding to the $2^{nd}$ radio interface technology, to-be-sent data on each LCH in the first logical channel subset may be first mapped, based on a priority and a PBR that are of the each LCH and corresponding to the first radio interface technology, onto the transport block corresponding to the first radio interface technology. When the transport block corresponding to the first radio interface technology still has a remaining capacity, remaining to-be-sent data on each LCH on which the remaining to-be-sent data exists in the first logical channel subset may be mapped, based on a priority that is of the each LCH and corresponding to the first radio interface technology, onto the transport block corresponding to the first radio interface technology, and when the transport block corresponding to the first radio interface technology still has a remaining capacity, to-be-sent data on each LCH in the second logical channel subset is then mapped, based on a priority and a PBR that are of the each LCH and corresponding to the first radio interface technology, onto the transport block corresponding to the first radio interface technology. Alternatively, to-be-sent data on each LCH in the second logical channel subset may be mapped, based on a priority and a PBR that are of the each LCH and corresponding to the first radio interface technology, onto the transport block corresponding to the first radio interface technology, and when the transport block corresponding to the first radio interface technology still has a remaining capacity, remaining to-be-sent data on each LCH on which the remaining to-be-sent data exists in the first logical channel subset is then mapped, based on a priority that is of the each LCH and corresponding to the first radio interface technology, onto the transport block corresponding to the first radio interface technology. Alternatively, to-be-sent data on each LCH in a first logical channel group may be mapped, based on a priority and a PBR that are of the each LCH and corresponding to the first radio interface technology, onto the transport block corresponding to the first radio interface technology, when the transport block corresponding to the first radio interface technology still has a remaining capacity, remaining to-be-sent data on each LCH on which the remaining to-be-sent data exists in the first logical channel subset is then mapped, based on a priority that is of the each LCH and corresponding to the first radio interface technology, onto the transport block corresponding to the first radio interface technology, and when the transport block corresponding to the first radio interface technology still has a remaining capacity, to-be-sent data on each LCH in a second logical channel group is mapped, based on a priority and a PBR that are of the LCH and corresponding to the first radio interface technology, onto the transport block corresponding to the first radio interface technology. Finally, when the transport block corresponding to the first radio interface technology still has a remaining capacity, remaining to-be-sent data on each LCH on which the remaining to-be-sent data exists in the second logical channel subset is then mapped, based on a priority that is of the each LCH and corresponding to the first radio interface technology, onto the transport block corresponding to the first radio interface technology. The first logical channel group is a group of LCHs having a preset parameter in the second logical channel subset. The second logical channel group is a group of LCHs, other than the LCHs included in the first logical channel group, in the second logical channel subset.

For example, the first logical channel subset includes logical channels: an LCH 1, an LCH 2, and an LCH 3, and the second logical channel subset includes logical channels: an LCH 4, an LCH 5, and an LCH 6. The terminal first maps data on the LCH 1, the LCH 2, and the LCH 3 onto an uplink resource based on priorities LCH 1>LCH 2>LCH 3 and PBRs that are of the LCH 1, the LCH 2, and the LCH 3 and corresponding to the first radio interface technology. When there is still a remaining uplink resource, the terminal may map remaining to-be-sent data on the LCH 1, the LCH 2, and the LCH 3 onto the uplink resource based on the priorities LCH 1>LCH 2>LCH 3. When there is still a remaining uplink resource, the terminal then maps data on the LCH 4, the LCH 5, and the LCH 6 onto the uplink resource based on priorities LCH 4>LCH 5>LCH 6 and PBRs that are of the LCH 4, the LCH 5, and the LCH 6 and corresponding to the first radio interface technology. When there is still a remaining uplink resource, the terminal then maps remaining to-be-sent data on the LCH 4, the LCH 5, and the LCH 6 onto the uplink resource based on the priorities LCH 4>LCH 5>LCH 6.

For example, the first logical channel subset includes logical channels: an LCH 1, an LCH 2, and an LCH 3, and the second logical channel subset includes logical channels: an LCH 4, an LCH 5, and an LCH 6. The terminal first maps data on the LCH 1, the LCH 2, and the LCH 3 onto an uplink resource based on priorities LCH 1>LCH 2>LCH 3 and PBRs that are of the LCH 1, the LCH 2, and the LCH 3 and corresponding to the first radio interface technology. When there is still a remaining uplink resource, the terminal may map data on the LCH 4, the LCH 5, and the LCH 6 onto the uplink resource based on priorities LCH 4>LCH 5>LCH 6 and PBRs that are of the LCH 4, the LCH 5, and the LCH 6 and corresponding to the first radio interface technology. When there is still a remaining uplink resource, the terminal then maps remaining to-be-sent data on the LCH 1, the LCH 2, and the LCH 3 onto the uplink resource based on the priorities LCH 1>LCH 2>LCH 3. When there is still a remaining uplink resource, the terminal then maps remaining to-be-sent data on the LCH 4, the LCH 5, and the LCH 6 onto the uplink resource based on the priorities LCH 4>LCH 5>LCH 6.

For example, the first logical channel subset includes logical channels: an LCH 1, an LCH 2, and an LCH 3, and the second logical channel subset includes logical channels: an LCH 4, an LCH 5, and an LCH 6. The terminal first maps data on the LCH 1, the LCH 2, and the LCH 3 onto an uplink resource based on priorities LCH 1>LCH 2>LCH 3 and PBRs that are of the LCH 1, the LCH 2, and the LCH 3 and corresponding to the first radio interface technology. When there is still a remaining uplink resource, the terminal may map data on the LCH 4 having a preset parameter (or in other words, having a uniform high priority) onto the uplink resource based on a PBR that is of the LCH 4 and corresponding to the first radio interface technology. When there is still a remaining uplink resource, the terminal then maps remaining to-be-sent data on the LCH 1, the LCH 2, and the LCH 3 onto the uplink resource based on the priorities LCH 1>LCH 2>LCH 3. When there is still a remaining uplink resource, the terminal then maps, based on priorities that are of the LCH 5 and the LCH 6 and corresponding to the first radio interface technology and PBRs that are of the LCH 5 and the LCH 6 and corresponding to the first radio interface technology, data on the LCH 5 and the LCH 6 onto the transport block corresponding to the first radio interface technology. When there is still a remaining uplink resource, the terminal then maps remaining to-be-sent data on the LCH 4, the LCH 5, and the LCH 6 onto the uplink resource based on the priorities LCH 4>LCH 5>LCH 6.

In this embodiment, the logical channel set may include a first logical channel subset and a second logical channel subset, a $1^{st}$ radio interface technology of each LCH in the first logical channel subset is the first radio interface technology, a $2^{nd}$ radio interface technology of each LCH in the first logical channel subset is a second radio interface technology, a $1^{st}$ radio interface technology of each LCH in the second logical channel subset is the second radio interface technology, a $2^{nd}$ radio interface technology of each LCH in the second logical channel subset is the first radio interface technology, and a TTI of the first radio interface technology is greater than a TTI of the second radio interface technology, or in other words, data on an LCH corresponding to the second radio interface technology is latency-sensitive data. To-be-sent data on each LCH in the first logical channel subset may be mapped, based on a priority and a PBR that are of the each LCH and corresponding to the first radio interface technology, onto the transport block corresponding to the first radio interface technology. When first data that has been transmitted by using the transport block corresponding to the first radio interface technology exists in to-be-sent data corresponding to the second logical channel subset, and a message that is sent by the access network device and that is used to indicate that the first data is successfully transmitted is not received, the first data may be mapped onto a transport block corresponding to the second radio interface technology. The first data may be data mapped according to a rule in the foregoing implementation. The to-be-sent data is data that has not been transmitted, or data that needs to be retransmitted after a transmission failure is determined based on a received ARQ feedback.

Figure 4:
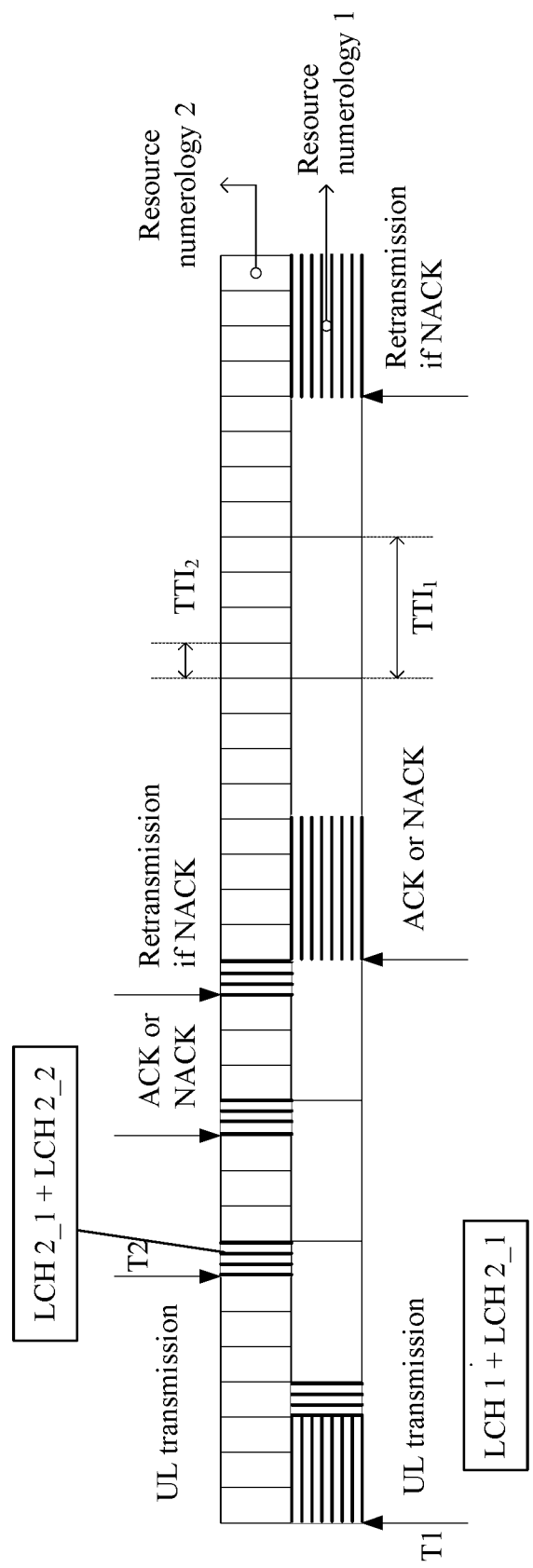
FIG. 4 is a schematic diagram of a data mapping manner according to an embodiment of the present disclosure.

For example, the first logical channel subset includes a logical channel LCH 1, and the second logical channel subset includes a logical channel LCH 2. FIG. 4 is a schematic diagram of a data mapping manner according to an embodiment of the present disclosure. As shown in FIG. 4, when an uplink scheduling grant received by the terminal indicates that the terminal has an uplink resource corresponding to the first radio interface technology at a T1 moment, to-be-transmitted data exists on both the LCH 1 and the LCH 2. The terminal may map LCH 1 data on the LCH 1 and LCH 2_1 data on the LCH 2 onto the uplink resource corresponding to the first radio interface technology at the T1 moment in a mapping manner disclosed in the foregoing embodiment. In the figure, a horizontal line part represents the LCH 1 data on the LCH 1, and a vertical line part represents the LCH 2_1 data on the LCH 2. When the uplink scheduling grant received by the terminal indicates that the terminal has an uplink resource corresponding to the second radio interface technology at a T2 moment, if a message that is sent by the access network device and that is used to indicate that the LCH 2_1 data is successfully transmitted has not been received at the T2 moment, the LCH 2_1 data may be mapped, at the T2 moment, onto the transport block corresponding to the second radio interface technology.

It should be noted that, in an LTE or similar communications system, the LCH 1 data, the LCH 2_1 data, and LCH 2_2 data may be PDCP PDUs obtained after processing at a PDCP layer. Behavior of mapping, by the terminal, the LCH 2_1 data onto different transport blocks may be considered as a process of performing segmentation and concatenation on a corresponding PDCP PDU to obtain different RLC PDUs. For another communications system including a future communications system, the LCH 1 data, the LCH 2_1 data, and the LCH 2_2 data are data before segmentation and concatenation. When a buffer size is calculated to send a buffer status report (BSR), a size of the LCH 2_1 data that has been transmitted is recalculated in the BSR.

Figure 5:
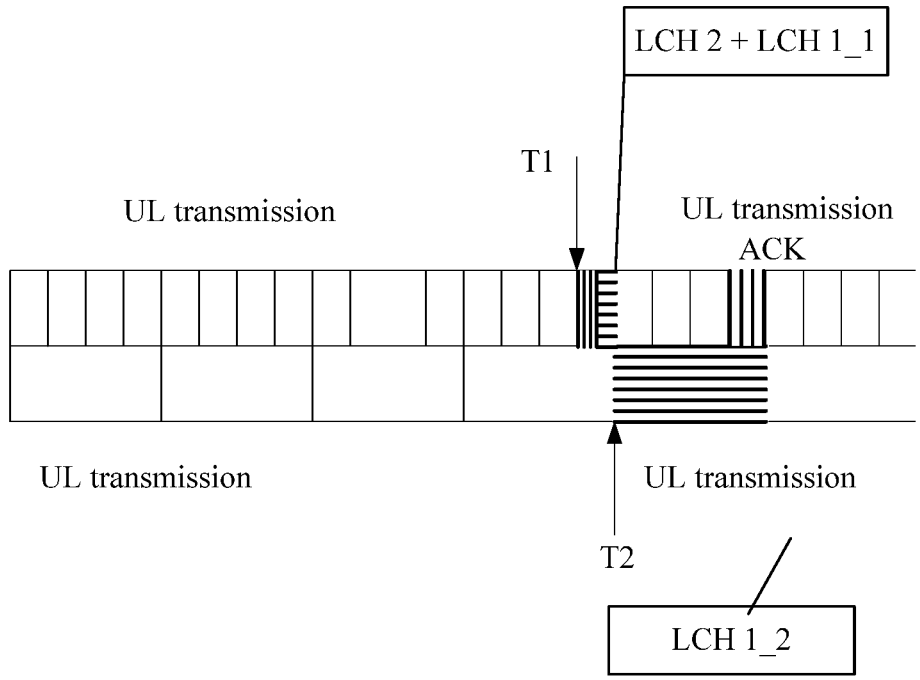
FIG. 5 is a schematic diagram of another data mapping manner according to an embodiment of the present disclosure.

For example, the first logical channel subset includes a logical channel LCH 1, and the second logical channel subset includes a logical channel LCH 2. FIG. 5 is a schematic diagram of another data mapping manner according to an embodiment of the present disclosure. As shown in FIG. 5, when an uplink scheduling grant received by the terminal indicates that the terminal has an uplink resource corresponding to the first radio interface technology at a T1 moment, to-be-transmitted data exists on both the LCH 1 and the LCH 2. The terminal may map LCH_1 data on the LCH 1 and LCH 2 data on the LCH 2 onto an uplink resource corresponding to the second radio interface technology at the T1 moment in a mapping manner disclosed in the foregoing embodiment. When the uplink scheduling grant received by the terminal indicates that the terminal has an uplink resource corresponding to the first radio interface technology at a T2 moment, LCH 1_1 data does not need to be mapped, at the T2 moment, onto the transport block corresponding to the first radio interface technology. The LCH 1 is for a latency-insensitive service. Before a message used to indicate that the LCH 1_1 data is successfully or unsuccessfully transmitted is received, the LCH 1_1 data is processed as data that has been transmitted.

In this embodiment, the logical channel set may include a first logical channel subset and a second logical channel subset, a $1^{st}$ radio interface technology of each LCH in the first logical channel subset is the first radio interface technology, a $2^{nd}$ radio interface technology of each LCH in the first logical channel subset is a second radio interface technology, a $1^{st}$ radio interface technology of each LCH in the second logical channel subset is the second radio interface technology, and a $2^{nd}$ radio interface technology of each LCH in the second logical channel subset is the first radio interface technology. When a message that is sent by the access network device and that is used to indicate that second data on the second logical channel subset is unsuccessfully transmitted on the transport block corresponding to the first radio interface technology is received before a transport block corresponding to the second radio interface technology is transmitted, the second data is mapped onto the transport block corresponding to the second radio interface technology.

Figure 6:
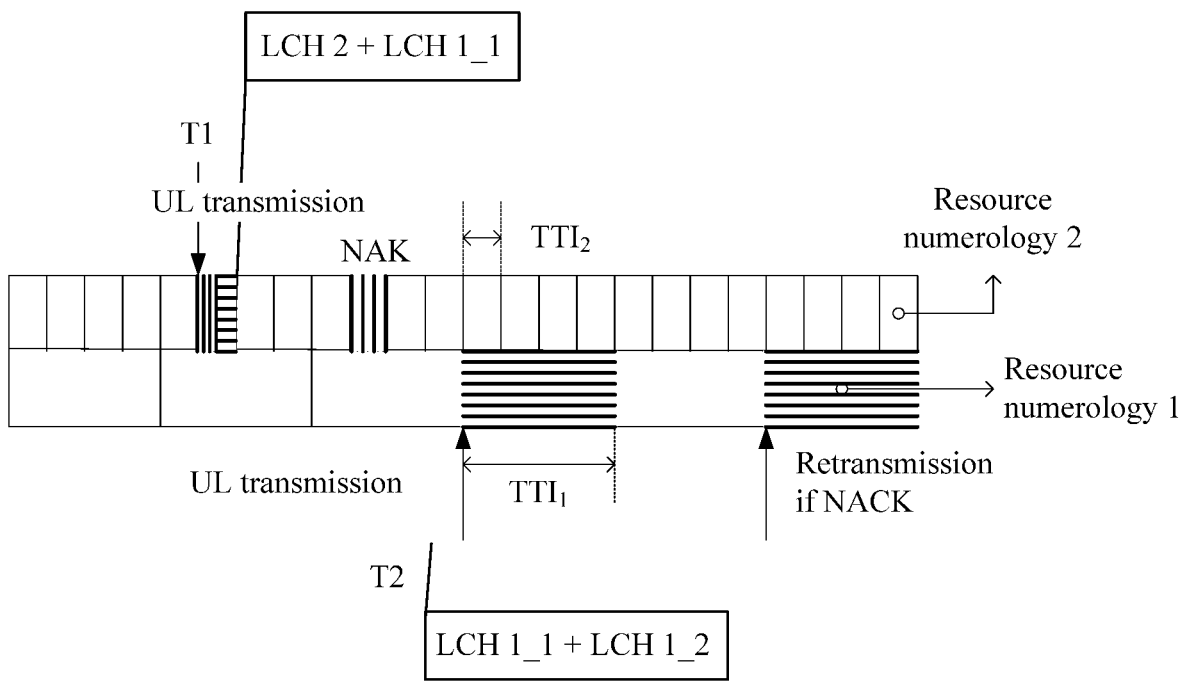
FIG. 6 is a schematic diagram of still another data mapping manner according to an embodiment of the present disclosure.

For example, the first logical channel subset includes a logical channel LCH 1, and the second logical channel subset includes a logical channel LCH 2. FIG. 6 is a schematic diagram of still another data mapping manner according to an embodiment of the present disclosure. As shown in FIG. 6, when an uplink scheduling grant received by the terminal indicates that the terminal has an uplink resource corresponding to the first radio interface technology at a T1 moment, to-be-transmitted data exists on both the LCH 1 and the LCH 2. The terminal may map LCH_1 data on the LCH 1 and LCH 2 data on the LCH 2 onto an uplink resource corresponding to the second radio interface technology at the T1 moment in a mapping manner disclosed in the foregoing embodiment. Before the uplink scheduling grant received by the terminal indicates that the terminal has an uplink resource corresponding to the first radio interface technology at a T2 moment, a message indicating that LCH 1_1 data is unsuccessfully transmitted is received. Therefore, the LCH 1_1 data needs to be mapped, at the T2 moment, onto the transport block corresponding to the first radio interface technology. LCH 1_2 data is remaining to-be-sent data on the LCH 1.

It should be noted that, in an LTE or similar communications system, the LCH 1_1 data, the LCH 1_2 data, and the LCH 2 data may be PDCP PDUs obtained after processing at a PDCP layer. Behavior of mapping, by the terminal, the LCH 1_1 data onto different transport blocks may be considered as a process of performing segmentation and concatenation on a corresponding PDCP PDU to obtain different RLC PDUs. For another communications system including a future communications system, the LCH 1_1 data, the LCH 1_2 data, and the LCH 2 data are data before segmentation and concatenation. When a buffer size is calculated to send a buffer status report (BSR), a size of the LCH 1_1 data that has been transmitted is recalculated in the BSR.

305. The terminal sends the mapped data to the access network device by using the transport block corresponding to the first radio interface technology.

In the resource allocation method shown in FIG. 3, the uplink scheduling grant sent by the access network device is received, where the uplink scheduling grant includes the transport block corresponding to the at least one radio interface technology; the logical channel set is selected from the logical channels of the terminal; and the to-be-sent data corresponding to the logical channel set is mapped, based on the priority and the prioritized bit rate that are of each logical channel in the logical channel set and corresponding to the first radio interface technology, onto the transport block corresponding to the first radio interface technology, instead of sequentially mapping, based on a priority of each logical channel in the logical channel set, all to-be-sent data on the each logical channel onto the transport block corresponding to the first radio interface technology, so that a probability that data on a logical channel having a low priority is transmitted can be increased, to improve resource allocation balance.

Figure 7:
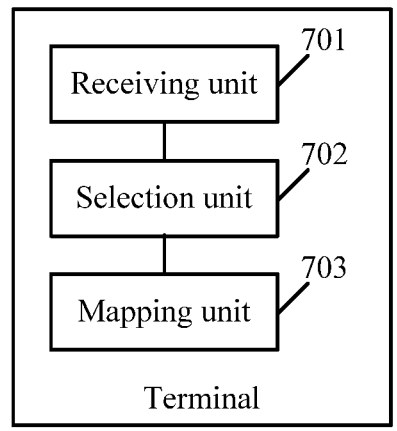
FIG. 7 is a schematic structural diagram of a terminal according to an embodiment of the present disclosure.

Based on the network architecture shown in FIG. 2, FIG. 7 is a schematic structural diagram of a terminal according to an embodiment of the present disclosure. As shown in FIG. 7, the terminal may include:

a receiving unit 701, configured to receive an uplink scheduling grant sent by an access network device, where the uplink scheduling grant may include a transport block corresponding to at least one radio interface technology;

a selection unit 702, configured to select a logical channel set from LCHs of the terminal, where the logical channel set is a set of LCHs on which to-be-sent data exists and that correspond to a first radio interface technology received by the receiving unit 701, and the first radio interface technology may be any one of the at least one radio interface technology, or a radio interface technology specified by the access network device in the at least one radio interface technology; and a mapping unit 703, configured to map, based on a priority and a PBR that are of each LCH in the logical channel set and corresponding to the first radio interface technology, to-be-sent data corresponding to the logical channel set onto a transport block corresponding to the first radio interface technology, where the logical channel set is selected by the selection unit 702.

The terminal shown in FIG. 7 receives the uplink scheduling grant sent by the access network device, where the uplink scheduling grant includes the transport block corresponding to the at least one radio interface technology; selects the logical channel set from the logical channels of the terminal; and maps, based on the priority and the prioritized bit rate that are of each logical channel in the logical channel set and corresponding to the first radio interface technology, the to-be-sent data corresponding to the logical channel set onto the transport block corresponding to the first radio interface technology, instead of sequentially mapping, based on a priority of each logical channel in the logical channel set, all to-be-sent data on the each logical channel onto the transport block corresponding to the first radio interface technology, so that a probability that data on a logical channel having a low priority is transmitted can be increased, to improve resource allocation balance.

Figure 8:
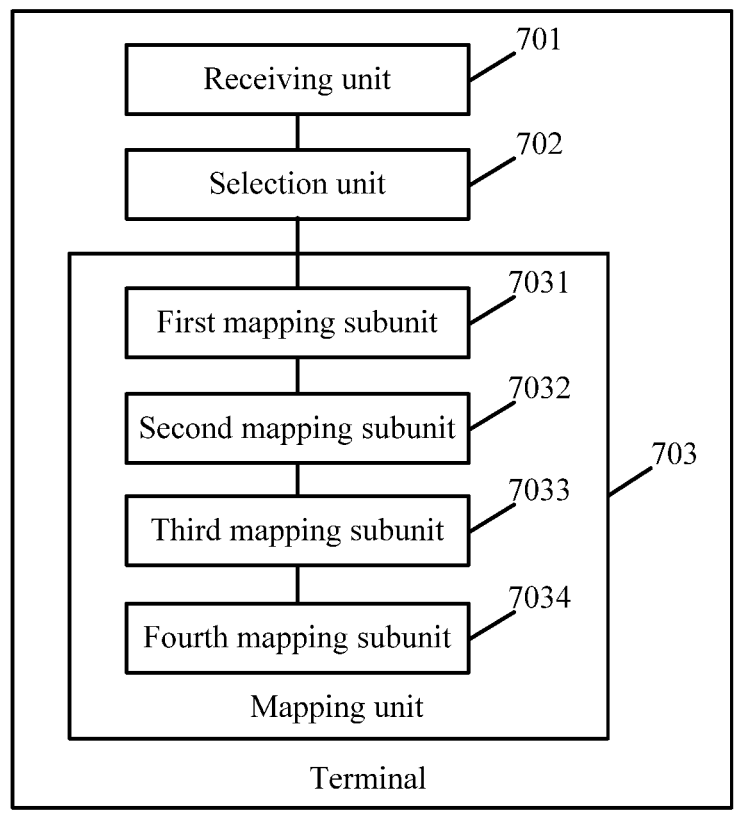
FIG. 8 is a schematic structural diagram of another terminal according to an embodiment of the present disclosure.

Based on the network architecture shown in FIG. 2, FIG. 8 is a schematic structural diagram of another terminal according to an embodiment of the present disclosure. The terminal shown in FIG. 8 is obtained by optimizing the terminal shown in FIG. 7. The logical channel set may include a first logical channel subset and a second logical channel subset, a $1^{st}$ radio interface technology of the first logical channel subset is the first radio interface technology, and a $2^{nd}$ radio interface technology of the second logical channel subset is the first radio interface technology.

The mapping unit 703 may include a first mapping subunit 7031, a second mapping subunit 7032, a third mapping subunit 7033, and a fourth mapping subunit 7034.

The first mapping subunit 7031 is configured to map, based on a priority and a PBR that are of each LCH in the first logical channel subset and corresponding to the first radio interface technology, to-be-sent data on the each LCH onto the transport block corresponding to the first radio interface technology. The second mapping subunit 7032 is configured to map, based on a priority that is of each LCH on which remaining to-be-sent data exists in the first logical channel subset and corresponding to the first radio interface technology, the remaining to-be-sent data on the each LCH onto the transport block corresponding to the first radio interface technology. The third mapping subunit 7033 is configured to map, based on a priority and a PBR that are of each LCH in the second logical channel subset and corresponding to the first radio interface technology, to-be-sent data on the each LCH onto the transport block corresponding to the first radio interface technology. The fourth mapping subunit 7034 is configured to map, based on a priority that is of each LCH on which remaining to-be-sent data exists in the second logical channel subset and corresponding to the first radio interface technology, the remaining to-be-sent data on the each LCH onto the transport block corresponding to the first radio interface technology.

Alternatively, the first mapping subunit 7031 is configured to map, based on a priority and a PBR that are of each LCH in the first logical channel subset and corresponding to the first radio interface technology, to-be-sent data on the each LCH onto the transport block corresponding to the first radio interface technology. The second mapping subunit 7032 is configured to map, based on a priority and a PBR that are of each LCH in the second logical channel subset and corresponding to the first radio interface technology, to-be-sent data on the each LCH onto the transport block corresponding to the first radio interface technology. The third mapping subunit 7033 is configured to map, based on a priority that is of each LCH on which remaining to-be-sent data exists in the first logical channel subset and corresponding to the first radio interface technology, the remaining to-be-sent data on the each LCH onto the transport block corresponding to the first radio interface technology. The fourth mapping subunit 7034 is configured to map, based on a priority that is of each LCH on which remaining to-be-sent data exists in the second logical channel subset and corresponding to the first radio interface technology, the remaining to-be-sent data on the each LCH onto the transport block corresponding to the first radio interface technology.

Specifically, after the first mapping subunit 7031 performs the mapping, when the transport block still has a remaining capacity, the second mapping subunit 7032 is triggered to perform the mapping; after the second mapping subunit 7032 performs the mapping, when the transport block still has a remaining capacity, the third mapping subunit 7033 is triggered to perform the mapping; and after the third mapping subunit 7033 performs the mapping, when the transport block still has a remaining capacity, the fourth mapping subunit 7034 is triggered to perform the mapping.

The terminal shown in FIG. 8 receives the uplink scheduling grant sent by the access network device, where the uplink scheduling grant includes the transport block corresponding to the at least one radio interface technology; selects the logical channel set from the logical channels of the terminal; and maps, based on the priority and the prioritized bit rate that are of each logical channel in the logical channel set and corresponding to the first radio interface technology, the to-be-sent data corresponding to the logical channel set onto the transport block corresponding to the first radio interface technology, instead of sequentially mapping, based on a priority of each logical channel in the logical channel set, all to-be-sent data on the each logical channel onto the transport block corresponding to the first radio interface technology, so that a probability that data on a logical channel having a low priority is transmitted can be increased, to improve resource allocation balance.

Figure 9:
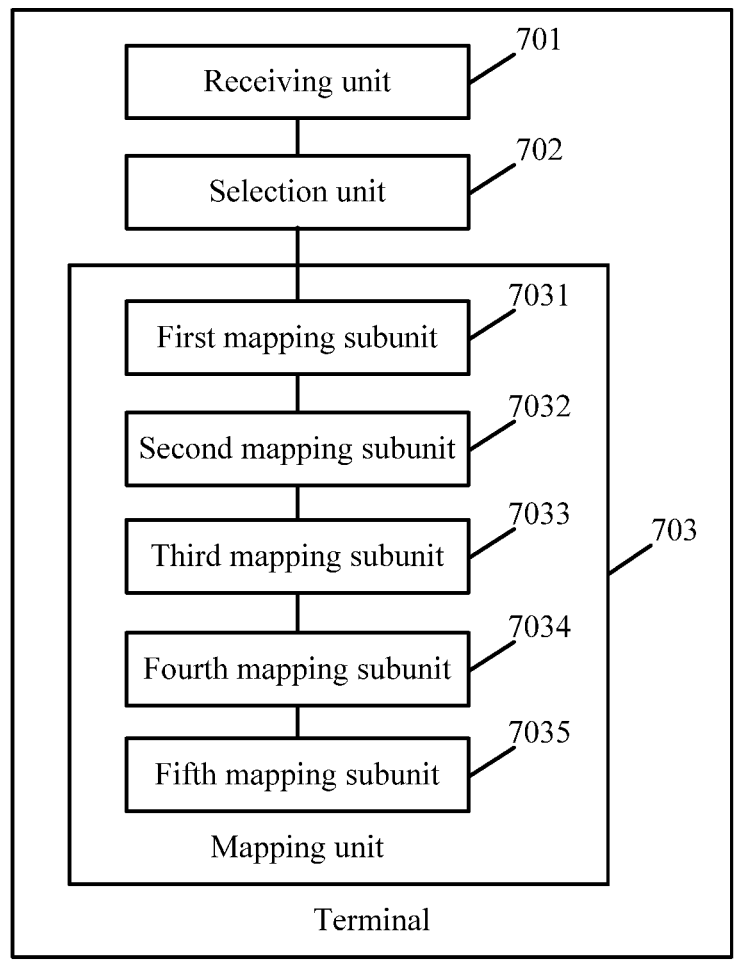
FIG. 9 is a schematic structural diagram of still another terminal according to an embodiment of the present disclosure.

Based on the network architecture shown in FIG. 2, FIG. 9 is a schematic structural diagram of still another terminal according to an embodiment of the present disclosure. The terminal shown in FIG. 9 is obtained by optimizing the terminal shown in FIG. 7. The logical channel set may include a first logical channel subset and a second logical channel subset, a $1^{st}$ radio interface technology of the first logical channel subset is the first radio interface technology, and a $2^{nd}$ radio interface technology of the second logical channel subset is the first radio interface technology.

The mapping unit 703 may include a first mapping subunit 7031, a second mapping subunit 7032, a third mapping subunit 7033, a fourth mapping subunit 7034, and a fifth mapping subunit 7035.

The first mapping subunit 7031 is configured to map, based on a priority and a PBR that are of each LCH in the first logical channel subset and corresponding to the first radio interface technology, to-be-sent data on the each LCH onto the transport block corresponding to the first radio interface technology.

The second mapping subunit 7032 is configured to map, based on a priority and a PBR that are of each LCH in a first logical channel group and corresponding to the first radio interface technology, to-be-sent data on the each LCH onto the transport block corresponding to the first radio interface technology, where the first logical channel group is a group of LCHs having a preset parameter in the second logical channel subset.

The third mapping subunit 7033 is configured to map, based on a priority that is of each LCH on which remaining to-be-sent data exists in the first logical channel subset and corresponding to the first radio interface technology, the remaining to-be-sent data on the each LCH onto the transport block corresponding to the first radio interface technology.

The fourth mapping subunit 7034 is configured to map, based on a priority and a PBR that are of each LCH in a second logical channel group and corresponding to the first radio interface technology, to-be-sent data on the each LCH onto the transport block corresponding to the first radio interface technology, where the second logical channel group is a group of LCHs, other than the LCHs included in the first logical channel group, in the second logical channel subset.

The fifth mapping subunit 7035 is configured to map, based on a priority that is of each LCH on which remaining to-be-sent data exists in the second logical channel subset and corresponding to the first radio interface technology, the remaining to-be-sent data on the each LCH onto the transport block corresponding to the first radio interface technology.

Specifically, after the first mapping subunit 7031 performs the mapping, when the transport block still has a remaining capacity, the second mapping subunit 7032 is triggered to perform the mapping; after the second mapping subunit 7032 performs the mapping, when the transport block still has a remaining capacity, the third mapping subunit 7033 is triggered to perform the mapping; after the third mapping subunit 7033 performs the mapping, when the transport block still has a remaining capacity, the fourth mapping subunit 7034 is triggered to perform the mapping; and after the fourth mapping subunit 7034 performs the mapping, when the transport block still has a remaining capacity, the fifth mapping subunit 7035 is triggered to perform the mapping.

The terminal shown in FIG. 9 receives the uplink scheduling grant sent by the access network device, where the uplink scheduling grant includes the transport block corresponding to the at least one radio interface technology; selects the logical channel set from the logical channels of the terminal; and maps, based on the priority and the prioritized bit rate that are of each logical channel in the logical channel set and corresponding to the first radio interface technology, the to-be-sent data corresponding to the logical channel set onto the transport block corresponding to the first radio interface technology, instead of sequentially mapping, based on a priority of each logical channel in the logical channel set, all to-be-sent data on the each logical channel onto the transport block corresponding to the first radio interface technology, so that a probability that data on a logical channel having a low priority is transmitted can be increased, to improve resource allocation balance.

Figure 10:
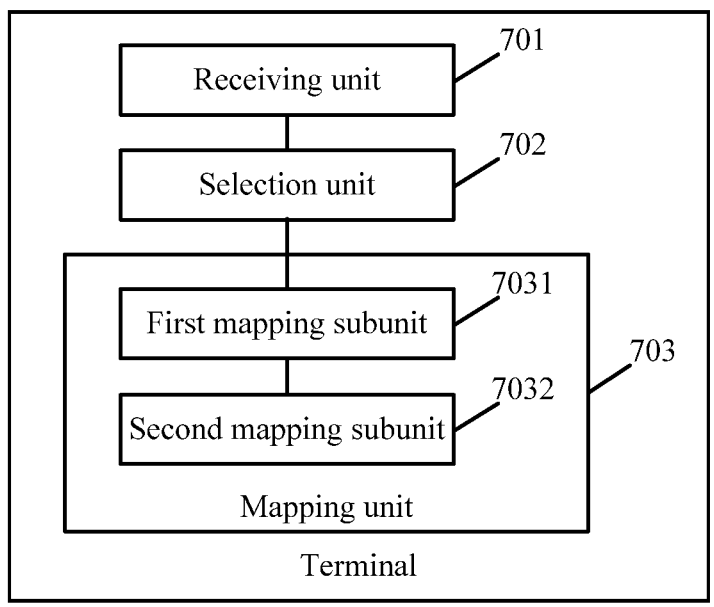
FIG. 10 is a schematic structural diagram of yet another terminal according to an embodiment of the present disclosure.

Based on the network architecture shown in FIG. 2, FIG. 10 is a schematic structural diagram of yet another terminal according to an embodiment of the present disclosure. The terminal shown in FIG. 10 is obtained by optimizing the terminal shown in FIG. 7. The logical channel set may include a first logical channel subset and a second logical channel subset, a $1^{st}$ radio interface technology of each LCH in the first logical channel subset is the first radio interface technology, a $2^{nd}$ radio interface technology of each LCH in the first logical channel subset is a second radio interface technology, a $1^{st}$ radio interface technology of each LCH in the second logical channel subset is the second radio interface technology, a $2^{nd}$ radio interface technology of each LCH in the second logical channel subset is the first radio interface technology, and a TTI of the first radio interface technology is greater than a TTI of the second radio interface technology.

The mapping unit 703 may include:

a first mapping subunit 7031, configured to map, based on a priority and a PBR that are of each LCH in the first logical channel subset and corresponding to the first radio interface technology, to-be-sent data on the each LCH onto the transport block corresponding to the first radio interface technology; and a second mapping subunit 7032, configured to: when first data that has been transmitted, through mapping by the first mapping subunit 7031, on the mapped transport block corresponding to the first radio interface technology exists in to-be-sent data corresponding to the second logical channel subset, and a message that is sent by the access network device and that is used to indicate that the first data is successfully transmitted is not received, map the first data onto a transport block corresponding to the second radio interface technology.

In a possible implementation, the logical channel set may include a first logical channel subset and a second logical channel subset, a $1^{st}$ radio interface technology of each LCH in the first logical channel subset is the first radio interface technology, a $2^{nd}$ radio interface technology of each LCH in the first logical channel subset is a second radio interface technology, a $1^{st}$ radio interface technology of each LCH in the second logical channel subset is the second radio interface technology, and a $2^{nd}$ radio interface technology of each LCH in the second logical channel subset is the first radio interface technology; and the mapping unit 703 is specifically configured to: when a message that is sent by the access network device and that is used to indicate that second data on the second logical channel subset is unsuccessfully transmitted on the transport block corresponding to the first radio interface technology is received before a transport block corresponding to the second radio interface technology is transmitted, map the second data onto the transport block corresponding to the second radio interface technology.

The terminal shown in FIG. 10 receives the uplink scheduling grant sent by the access network device, where the uplink scheduling grant includes the transport block corresponding to the at least one radio interface technology; selects the logical channel set from the logical channels of the terminal; and maps, based on the priority and the prioritized bit rate that are of each logical channel in the logical channel set and corresponding to the first radio interface technology, the to-be-sent data corresponding to the logical channel set onto the transport block corresponding to the first radio interface technology, instead of sequentially mapping, based on a priority of each logical channel in the logical channel set, all to-be-sent data on the each logical channel onto the transport block corresponding to the first radio interface technology, so that a probability that data on a logical channel having a low priority is transmitted can be increased, to improve resource allocation balance.

Figure 11:
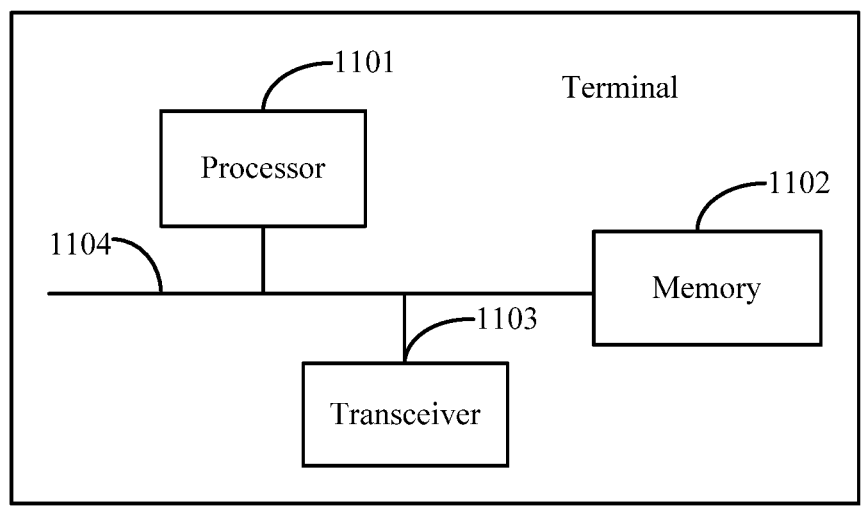
FIG. 11 is a schematic structural diagram of still yet another terminal according to an embodiment of the present disclosure.

Based on the network architecture shown in FIG. 2, FIG. 11 is a schematic structural diagram of still yet another terminal according to an embodiment of the present disclosure. As shown in FIG. 11, the terminal may include a processor 1101, a memory 1102, a transceiver 1103, and a bus 1104. The processor 1101 may be a general-purpose central processing unit (CPU), a plurality of CPUs, a microprocessor, an application-specific integrated circuit (ASIC), or one or more integrated circuits configured to control program execution of solutions of the present disclosure. The memory 1102 may be but is not limited to a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in an instruction or data structure form and can be accessed by a computer. The memory 1102 may exist independently. The bus 1104 is connected to the processor 1101. The memory 1102 may alternatively be integrated with the processor 1101. The transceiver 1103 is configured to communicate with another device or a communications network such as the Ethernet, a radio access network (RAN), or a wireless local area network (WLAN). The bus 1104 may include a channel for transferring information between the foregoing components.

The transceiver 1103 is configured to receive an uplink scheduling grant sent by an access network device, where the uplink scheduling grant includes a transport block corresponding to at least one radio interface technology.

The memory 1102 stores a set of program code, and the processor 1101 is configured to invoke the program code stored in the memory 1102 to perform the following operations:

selecting a logical channel set from LCHs of the terminal, where the logical channel set is a set of LCHs on which to-be-sent data exists and that correspond to a first radio interface technology, and the first radio interface technology is any one of the at least one radio interface technology, or a radio interface technology specified by the access network device in the at least one radio interface technology; and mapping, based on a priority and a PBR that are of each LCH in the logical channel set and corresponding to the first radio interface technology, to-be-sent data corresponding to the logical channel set onto a transport block corresponding to the first radio interface technology.

In a possible implementation, the logical channel set may include a first logical channel subset and a second logical channel subset, a $1^{st}$ radio interface technology of the first logical channel subset is the first radio interface technology, and a $2^{nd}$ radio interface technology of the second logical channel subset is the first radio interface technology; and the mapping, by the processor 1101 based on a priority and a PBR that are of each LCH in the logical channel set and corresponding to the first radio interface technology, to-be-sent data corresponding to the logical channel set onto a transport block corresponding to the first radio interface technology includes:

mapping, based on a priority and a PBR that are of each LCH in the first logical channel subset and corresponding to the first radio interface technology, to-be-sent data on the each LCH onto the transport block corresponding to the first radio interface technology.

In a possible implementation, the mapping, by the processor 1101 based on a priority and a PBR that are of each LCH in the logical channel set and corresponding to the first radio interface technology, to-be-sent data corresponding to the logical channel set onto a transport block corresponding to the first radio interface technology further includes:

mapping, based on a priority that is of each LCH on which remaining to-be-sent data exists in the first logical channel subset and corresponding to the first radio interface technology, the remaining to-be-sent data on the each LCH onto the transport block corresponding to the first radio interface technology; and mapping, based on a priority and a PBR that are of each LCH in the second logical channel subset and corresponding to the first radio interface technology, to-be-sent data on the each LCH onto the transport block corresponding to the first radio interface technology.

In a possible implementation, the mapping, by the processor 1101 based on a priority and a PBR that are of each LCH in the logical channel set and corresponding to the first radio interface technology, to-be-sent data corresponding to the logical channel set onto a transport block corresponding to the first radio interface technology further includes:

mapping, based on a priority and a PBR that are of each LCH in the second logical channel subset and corresponding to the first radio interface technology, to-be-sent data on the each LCH onto the transport block corresponding to the first radio interface technology; and mapping, based on a priority that is of each LCH on which remaining to-be-sent data exists in the first logical channel subset and corresponding to the first radio interface technology, the remaining to-be-sent data on the each LCH onto the transport block corresponding to the first radio interface technology.

In a possible implementation, the mapping, by the processor 1101 based on a priority and a PBR that are of each LCH in the logical channel set and corresponding to the first radio interface technology, to-be-sent data corresponding to the logical channel set onto a transport block corresponding to the first radio interface technology further includes:

mapping, based on a priority and a PBR that are of each LCH in a first logical channel group and corresponding to the first radio interface technology, to-be-sent data on the each LCH onto the transport block corresponding to the first radio interface technology, where the first logical channel group is a group of LCHs having a preset parameter in the second logical channel subset;

mapping, based on a priority that is of each LCH on which remaining to-be-sent data exists in the first logical channel subset and corresponding to the first radio interface technology, the remaining to-be-sent data on the each LCH onto the transport block corresponding to the first radio interface technology; and mapping, based on a priority and a PBR that are of each LCH in a second logical channel group and corresponding to the first radio interface technology, to-be-sent data on the each LCH onto the transport block corresponding to the first radio interface technology, where the second logical channel group is a group of LCHs, other than the LCHs included in the first logical channel group, in the second logical channel subset.

In a possible implementation, the mapping, by the processor 1101 based on a priority and a PBR that are of each LCH in the logical channel set and corresponding to the first radio interface technology, to-be-sent data corresponding to the each logical channel set onto a transport block corresponding to the first radio interface technology further includes:

mapping, based on a priority that is of each LCH on which remaining to-be-sent data exists in the second logical channel subset and corresponding to the first radio interface technology, the remaining to-be-sent data on the each LCH onto the transport block corresponding to the first radio interface technology.

In a possible implementation, the logical channel set includes a first logical channel subset and a second logical channel subset, a $1^{st}$ radio interface technology of each LCH in the first logical channel subset is the first radio interface technology, a $2^{nd}$ radio interface technology of each LCH in the first logical channel subset is a second radio interface technology, a $1^{st}$ radio interface technology of each LCH in the second logical channel subset is the second radio interface technology, a $2^{nd}$ radio interface technology of each LCH in the second logical channel subset is the first radio interface technology, and a TTI of the first radio interface technology is greater than a TTI of the second radio interface technology; and the mapping, by the processor 1101 based on a priority and a PBR that are of each LCH in the logical channel set and corresponding to the first radio interface technology, to-be-sent data corresponding to the logical channel set onto a transport block corresponding to the first radio interface technology includes:

mapping, based on a priority and a PBR that are of each LCH in the first logical channel subset and corresponding to the first radio interface technology, to-be-sent data on the each LCH onto the transport block corresponding to the first radio interface technology; and when first data that has been transmitted by using the transport block corresponding to the first radio interface technology exists in to-be-sent data corresponding to the second logical channel subset, and a message that is sent by the access network device and that is used to indicate that the first data is successfully transmitted is not received, mapping the first data onto a transport block corresponding to the second radio interface technology.

In a possible implementation, the logical channel set may include a first logical channel subset and a second logical channel subset, a $1^{st}$ radio interface technology of each LCH in the first logical channel subset is the first radio interface technology, a $2^{nd}$ radio interface technology of each LCH in the first logical channel subset is a second radio interface technology, a $1^{st}$ radio interface technology of each LCH in the second logical channel subset is the second radio interface technology, and a $2^{nd}$ radio interface technology of each LCH in the second logical channel subset is the first radio interface technology; and the mapping, by the processor 1101 based on a priority and a PBR that are of each LCH in the logical channel set and corresponding to the first radio interface technology, to-be-sent data corresponding to the logical channel set onto a transport block corresponding to the first radio interface technology includes:

when a message that is sent by the access network device and that is used to indicate that second data on the second logical channel subset is unsuccessfully transmitted on the transport block corresponding to the first radio interface technology is received before a transport block corresponding to the second radio interface technology is transmitted, mapping the second data onto the transport block corresponding to the second radio interface technology.

Steps 303 and 304 may be performed by the processor 1101 in the terminal by invoking the program code stored in the memory 1102, and steps 301 and 302 and step 305 may be performed by the transceiver 1103 in the terminal.

The receiving unit 701 may be implemented by the transceiver 1103 in the terminal, and the selection unit 702 and the mapping unit 703 may be implemented by the processor 1101 and the memory 1102 in the terminal.

The terminal shown in FIG. 11 receives the uplink scheduling grant sent by the access network device, where the uplink scheduling grant includes the transport block corresponding to the at least one radio interface technology; selects the logical channel set from the logical channels of the terminal; and maps, based on the priority and the prioritized bit rate that are of each logical channel in the logical channel set and corresponding to the first radio interface technology, the to-be-sent data corresponding to the logical channel set onto the transport block corresponding to the first radio interface technology, instead of sequentially mapping, based on a priority of each logical channel in the logical channel set, all to-be-sent data on the logical channel onto the transport block corresponding to the first radio interface technology, so that a probability that data on a logical channel having a low priority is transmitted can be increased, to improve resource allocation balance.

An embodiment of the present disclosure further discloses a readable storage medium. The readable storage medium stores program code used by a terminal to perform the resource allocation method shown in FIG. 3.

A person of ordinary skill in the art may understand that all or some of the steps of the methods in the embodiments may be implemented by a program instructing relevant hardware. The program may be stored in a computer readable storage medium. The storage medium may include a flash memory, a read-only memory (ROM), a random access memory (RAM), a magnetic disk, an optical disk, or the like.

Although the present disclosure is described herein with reference to the embodiments, in a process of implementing the present disclosure that claims protection, a person skilled in the art may understand and implement another variation of the disclosed embodiments by viewing the accompanying drawings, disclosed content, and the appended claims. In the claims, "comprising" does not exclude another component or another step, and "a/an" or "one" does not exclude "a plurality of". A single processor or another single unit may implement functions enumerated in the claims. Some measures are recorded in dependent claims that are different from each other, but this does not mean that these measures cannot be combined to produce a better effect.

The resource allocation method and the terminal disclosed in the embodiments of the present disclosure are described above in detail. The principle and implementations of the present disclosure are described in this specification by using specific examples. The description about the embodiments of the present disclosure is merely provided to help understand the method and core ideas of the present disclosure. In addition, a person of ordinary skill in the art can make variations to the present disclosure in terms of the specific implementations and application scopes according to the ideas of the present disclosure. Therefore, the content of this specification shall not be construed as a limitation to the present disclosure.

What is claimed is:

1. A resource allocation method, wherein the method is applied to a terminal, and comprises:
   receiving configuration information of logical channels from an access network device, wherein each logical channel of the logical channels corresponds to at least one radio interface technology, and each radio interface technology of the at least one radio interface technology comprises a frame structure, and the frame structure comprises a format and a parameter of data transmitted at a physical layer;

receiving an uplink scheduling grant from the access network device, wherein the uplink scheduling grant indicates an uplink resource corresponding to a first radio interface technology, and the first radio interface technology is indicated by the access network device;

selecting a logical channel set from the logical channels, wherein the logical channel set comprises logical channels on which to-be-sent data exists and that correspond to the first radio interface technology; and mapping, based on a priority and a prioritized bit rate that are of each logical channel in the logical channel set and corresponding to the first radio interface technology, to-be-sent data corresponding to the logical channel set onto the uplink resource corresponding to the first radio interface technology.

2. The method according to claim 1, wherein the logical channel set comprises a first logical channel subset and a second logical channel subset, a $1^{st}$ radio interface technology of the first logical channel subset is the first radio interface technology, and a $2^{nd}$ radio interface technology of the second logical channel subset is the first radio interface technology; and wherein the mapping the to-be-sent data corresponding to the logical channel set onto the uplink resource corresponding to the first radio interface technology comprises:

mapping, based on a priority and a prioritized bit rate that are of each logical channel in the first logical channel subset and corresponding to the first radio interface technology, to-be-sent data on the each logical channel onto the uplink resource corresponding to the first radio interface technology.

3. The method according to claim 2, wherein the mapping the to-be-sent data corresponding to the logical channel set onto the uplink resource corresponding to the first radio interface technology further comprises:

mapping, based on a priority that is of each logical channel on which remaining to-be-sent data exists in the first logical channel subset and corresponding to the first radio interface technology, the remaining to-be-sent data on the each logical channel onto the uplink resource corresponding to the first radio interface technology; and mapping, based on a priority and a prioritized bit rate that are of each logical channel in the second logical channel subset and corresponding to the first radio interface technology, to-be-sent data on the each logical channel onto the uplink resource corresponding to the first radio interface technology.

4. The method according to claim 2, wherein the mapping the to-be-sent data corresponding to the logical channel set onto the uplink resource corresponding to the first radio interface technology further comprises:

mapping, based on a priority and a prioritized bit rate that are of each logical channel in the second logical channel subset and corresponding to the first radio interface technology, to-be-sent data on the each logical channel onto the uplink resource corresponding to the first radio interface technology; and mapping, based on a priority that is of each logical channel on which remaining to-be-sent data exists in the first logical channel subset and corresponding to the first radio interface technology, the remaining to-be-sent data on the each logical channel onto the uplink resource corresponding to the first radio interface technology.

5. The method according to claim 2, wherein the mapping the to-be-sent data corresponding to the logical channel set onto the uplink resource corresponding to the first radio interface technology further comprises:

mapping, based on a priority and a prioritized bit rate that are of each logical channel in a first logical channel group and corresponding to the first radio interface technology, to-be-sent data on the each logical channel onto the uplink resource corresponding to the first radio interface technology, wherein the first logical channel group is a group of logical channels having a preset parameter in the second logical channel subset;

mapping, based on a priority that is of each logical channel on which remaining to-be-sent data exists in the first logical channel subset and corresponding to the first radio interface technology, the remaining to-be-sent data on the each logical channel onto the uplink resource corresponding to the first radio interface technology; and mapping, based on a priority and a prioritized bit rate that are of each logical channel in a second logical channel group and corresponding to the first radio interface technology, to-be-sent data on the each logical channel onto the uplink resource corresponding to the first radio interface technology, wherein the second logical channel group is a group of logical channels, other than the logical channels comprised in the first logical channel group, in the second logical channel subset.

6. The method according to claim 3, wherein the mapping the to-be-sent data corresponding to the logical channel set onto the uplink resource corresponding to the first radio interface technology further comprises:

mapping, based on a priority that is of each logical channel on which remaining to-be-sent data exists in the second logical channel subset and corresponding to the first radio interface technology, the remaining to-be-sent data on the each logical channel onto the uplink resource corresponding to the first radio interface technology.

7. The method according to claim 1, wherein the logical channel set comprises a first logical channel subset and a second logical channel subset, a $1^{st}$ radio interface technology of each logical channel in the first logical channel subset is the first radio interface technology, a $2^{nd}$ radio interface technology of each logical channel in the first logical channel subset is a second radio interface technology, a $1^{st}$ radio interface technology of each logical channel in the second logical channel subset is the second radio interface technology, a $2^{nd}$ radio interface technology of each logical channel in the second logical channel subset is the first radio interface technology, and a transmission time interval of the first radio interface technology is greater than a transmission time interval of the second radio interface technology; and wherein the mapping the to-be-sent data corresponding to the logical channel set onto the uplink resource corresponding to the first radio interface technology comprises:

mapping, based on a priority and a prioritized bit rate that are of each logical channel in the first logical channel subset and corresponding to the first radio interface technology, to-be-sent data on the each logical channel onto the uplink resource corresponding to the first radio interface technology; and when first data that has been transmitted by using the uplink resource corresponding to the first radio interface technology exists in to-be-sent data corresponding to the second logical channel subset, and a message that is sent by the access network device and that is used to indicate that the first data is successfully transmitted is not received, mapping the first data onto an uplink resource corresponding to the second radio interface technology.

8. The method according to claim 1, wherein the logical channel set comprises a first logical channel subset and a second logical channel subset, a $1^{st}$ radio interface technology of each logical channel in the first logical channel subset is the first radio interface technology, a $2^{nd}$ radio interface technology of each logical channel in the first logical channel subset is a second radio interface technology, a $1^{st}$ radio interface technology of each logical channel in the second logical channel subset is the second radio interface technology, and a $2^{nd}$ radio interface technology of each logical channel in the second logical channel subset is the first radio interface technology; and wherein the mapping the to-be-sent data corresponding to the logical channel set onto the uplink resource corresponding to the first radio interface technology comprises:

when a message that is sent by the access network device and that is used to indicate that second data on the second logical channel subset is unsuccessfully transmitted on the uplink resource corresponding to the first radio interface technology is received before a uplink resource corresponding to the second radio interface technology is transmitted, mapping the second data onto the uplink resource corresponding to the second radio interface technology.

9. A terminal, comprising:
a transceiver, configured to:
receive configuration information of logical channels from an access network device, wherein each logical channel of the logical channels corresponds to at least one radio interface technology, and each radio interface technology of the at least one radio interface technology comprises a frame structure, and the frame structure comprises a format and a parameter of data transmitted at a physical layer; and
receive an uplink scheduling grant from the access network device, wherein the uplink scheduling grant indicates an uplink resource corresponding to a first radio interface technology, and the first radio interface technology is indicated by the access network device; and
a processor, configured to:
select a logical channel set from the logical channels, wherein the logical channel set comprises logical channels on which to-be-sent data exists and that correspond to the first radio interface technology; and
map, based on a priority and a prioritized bit rate that are of each logical channel in the logical channel set and corresponding to the first radio interface technology, to-be-sent data corresponding to the logical channel set onto the uplink resource corresponding to the first radio interface technology.

10. The terminal according to claim 9, wherein the logical channel set comprises a first logical channel subset and a second logical channel subset, a $1^{st}$ radio interface technology of the first logical channel subset is the first radio interface technology, and a $2^{nd}$ radio interface technology of the second logical channel subset is the first radio interface technology; and wherein the processor is further configured to map, based on a priority and a prioritized bit rate that are of each logical channel in the first logical channel subset and corresponding to the first radio interface technology, to-be-sent data on the each logical channel onto the uplink resource corresponding to the first radio interface technology.

11. The terminal according to claim 10, wherein the processor is further configured to:
map, based on a priority that is of each logical channel on which remaining to-be-sent data exists in the first logical channel subset and corresponding to the first radio interface technology, the remaining to-be-sent data on the each logical channel onto the uplink resource corresponding to the first radio interface technology; and
map, based on a priority and a prioritized bit rate that are of each logical channel in the second logical channel subset and corresponding to the first radio interface technology, to-be-sent data on the each logical channel onto the uplink resource corresponding to the first radio interface technology.

12. The terminal according to claim 10, wherein the processor is further configured to:
map, based on a priority and a prioritized bit rate that are of each logical channel in the second logical channel subset and corresponding to the first radio interface technology, to-be-sent data on the each logical channel onto the uplink resource corresponding to the first radio interface technology; and
map, based on a priority that is of each logical channel on which remaining to-be-sent data exists in the first logical channel subset and corresponding to the first radio interface technology, the remaining to-be-sent data on the each logical channel onto the uplink resource corresponding to the first radio interface technology.

13. The terminal according to claim 10, wherein the processor is further configured to:
map, based on a priority and a prioritized bit rate that are of each logical channel in a first logical channel group and corresponding to the first radio interface technology, to-be-sent data on the each logical channel onto the uplink resource corresponding to the first radio interface technology, wherein the first logical channel group is a group of logical channels having a preset parameter in the second logical channel subset;
map, based on a priority that is of each logical channel on which remaining to-be-sent data exists in the first logical channel subset and corresponding to the first radio interface technology, the remaining to-be-sent data on the each logical channel onto the uplink resource corresponding to the first radio interface technology; and
map, based on a priority and a prioritized bit rate that are of each logical channel in a second logical channel group and corresponding to the first radio interface technology, to-be-sent data on the each logical channel onto the uplink resource corresponding to the first radio interface technology, wherein the second logical channel group is a group of logical channels, other than the logical channels comprised in the first logical channel group, in the second logical channel subset.

14. The terminal according to claim 11, wherein the processor is further configured to map, based on a priority that is of each logical channel on which remaining to-be-sent data exists in the second logical channel subset and corresponding to the first radio interface technology, the remaining to-be-sent data on the each logical channel onto the uplink resource corresponding to the first radio interface technology.

15. The terminal according to claim 9, wherein the logical channel set comprises a first logical channel subset and a second logical channel subset, a $1^{st}$ radio interface technology of each logical channel in the first logical channel subset is the first radio interface technology, a $2^{nd}$ radio interface technology of each logical channel in the first logical channel subset is a second radio interface technology, a $1^{st}$ radio interface technology of each logical channel in the second logical channel subset is the second radio interface technology, a $2^{nd}$ radio interface technology of each logical channel in the second logical channel subset is the first radio interface technology, and a transmission time interval of the first radio interface technology is greater than a transmission time interval of the second radio interface technology; and wherein the processor is further configured to:

map, based on a priority and a prioritized bit rate that are of each logical channel in the first logical channel subset and corresponding to the first radio interface technology, to-be-sent data on the each logical channel onto the uplink resource corresponding to the first radio interface technology; and when first data that has been transmitted by using the uplink resource corresponding to the first radio interface technology exists in to-be-sent data corresponding to the second logical channel subset, and a message that is sent by the access network device and that is used to indicate that the first data is successfully transmitted is not received, map the first data onto a uplink resource corresponding to the second radio interface technology.

16. The terminal according to claim 9, wherein the logical channel set comprises a first logical channel subset and a second logical channel subset, a $1^{st}$ radio interface technology of each logical channel in the first logical channel subset is the first radio interface technology, a $2^{nd}$ radio interface technology of each logical channel in the first logical channel subset is a second radio interface technology, a $1^{st}$ radio interface technology of each logical channel in the second logical channel subset is the second radio interface technology, and a $2^{nd}$ radio interface technology of each logical channel in the second logical channel subset is the first radio interface technology; and wherein the processor is further configured to: when a message that is sent by the access network device and that is used to indicate that second data on the second logical channel subset is unsuccessfully transmitted on the uplink resource corresponding to the first radio interface technology is received before a uplink resource corresponding to the second radio interface technology is transmitted, map the second data onto the uplink resource corresponding to the second radio interface technology.

17. An apparatus, comprising one or more processors coupled with a non-transitory storage medium storing executable instructions that when executed by the one or more processors, cause the one or more processors to perform steps comprising:

receiving configuration information of logical channels from an access network device, wherein each logical channel of the logical channels corresponds to at least one radio interface technology, and each radio interface technology of the at least one radio interface technology comprises a frame structure, and the frame structure comprises a format and a parameter of data transmitted at a physical layer;

receiving an uplink scheduling grant from the access network device, wherein the uplink scheduling grant indicates an uplink resource corresponding to a first radio interface technology, and the first radio interface technology is indicated by the access network device;

selecting a logical channel set from the logical channels, wherein the logical channel set comprises logical channels on which to-be-sent data exists and that correspond to the first radio interface technology; and mapping, based on a priority and a prioritized bit rate that are of each logical channel in the logical channel set and corresponding to the first radio interface technology, to-be-sent data corresponding to the logical channel set onto the uplink resource corresponding to the first radio interface technology.

18. The apparatus according to claim 17, wherein the logical channel set comprises a first logical channel subset and a second logical channel subset, a $1^{st}$ radio interface technology of the first logical channel subset is the first radio interface technology, and a $2^{nd}$ radio interface technology of the second logical channel subset is the first radio interface technology; and wherein the one or more processors are configured to perform steps further comprising mapping, based on a priority and a prioritized bit rate that are of each logical channel in the first logical channel subset and corresponding to the first radio interface technology, to-be-sent data on the each logical channel onto the uplink resource corresponding to the first radio interface technology.

19. The apparatus according to claim 18, wherein the one or more processors are configured to perform steps further comprising:

mapping, based on a priority that is of each logical channel on which remaining to-be-sent data exists in the first logical channel subset and corresponding to the first radio interface technology, the remaining to-be-sent data on the each logical channel onto the uplink resource corresponding to the first radio interface technology; and mapping, based on a priority and a prioritized bit rate that are of each logical channel in the second logical channel subset and corresponding to the first radio interface technology, to-be-sent data on the each logical channel onto the uplink resource corresponding to the first radio interface technology.

20. A non-transitory machine-readable medium having stored thereon, a computer program comprising at least one code section for distributing data, the at least one code section being executable by one or more processors, and when executed, causes the one or more processors to perform steps comprising:

receiving configuration information of logical channels from an access network device, wherein each logical channel of the logical channels corresponds to at least one radio interface technology, and each radio interface technology of the at least one radio interface technology comprises a frame structure, and the frame structure comprises a format and a corresponding parameter of data transmitted at a physical layer;

receiving an uplink scheduling grant from the access network device, wherein the uplink scheduling grant indicates an uplink resource corresponding to a first radio interface technology, and the first radio interface technology is indicated by the access network device;

selecting a logical channel set from the logical channels, wherein the logical channel set comprises logical channels on which to-be-sent data exists and that correspond to the first radio interface technology; and mapping, based on a priority and a prioritized bit rate that are of each logical channel in the logical channel set and corresponding to the first radio interface technology, to-be-sent data corresponding to the logical channel set onto the uplink resource corresponding to the first radio interface technology.

21. The non-transitory machine-readable medium according to claim 20, wherein the logical channel set comprises a first logical channel subset and a second logical channel subset, a $1^{st}$ radio interface technology of the first logical channel subset is the first radio interface technology, and a $2^{nd}$ radio interface technology of the second logical channel subset is the first radio interface technology; and wherein the at least one code section is further configured to cause one or more processors to perform steps further comprising mapping, based on a priority and a prioritized bit rate that are of each logical channel in the first logical channel subset and corresponding to the first radio interface technology, to-be-sent data on the each logical channel onto the uplink resource corresponding to the first radio interface technology.

22. The non-transitory machine-readable medium according to claim 21, wherein the at least one code section is further configured to cause one or more processors to perform steps further comprising:

mapping, based on a priority that is of each logical channel on which remaining to-be-sent data exists in the first logical channel subset and corresponding to the first radio interface technology, the remaining to-be-sent data on the each logical channel onto the uplink resource corresponding to the first radio interface technology; and mapping, based on a priority and a prioritized bit rate that are of each logical channel in the second logical channel subset and corresponding to the first radio interface technology, to-be-sent data on the each logical channel onto the uplink resource corresponding to the first radio interface technology.

23. A system, comprising: a terminal and an access network device configured for communication with the terminal, wherein:

the access network device is configured to transmit configuration information of logical channels to the terminal, wherein each logical channel of the logical channels corresponds to at least one radio interface technology, and each radio interface technology of the at least one radio interface technology comprises a frame structure, and the frame structure comprises a format and a corresponding parameter of data transmitted at a physical layer;

the access network device is configured to transmit an uplink scheduling grant to the terminal, wherein the uplink scheduling grant indicates an uplink resource corresponding to a first radio interface technology; and the terminal is configured to:

receive the configuration information;

receive the uplink scheduling grant;

select a logical channel set from logical channels of the terminal, wherein the logical channel set comprises logical channels on which to-be-sent data exists and that correspond to the first radio interface technology; and map, based on a priority and a prioritized bit rate that are of each logical channel in the logical channel set and corresponding to the first radio interface technology, to-be-sent data corresponding to the logical channel set onto the uplink resource corresponding to the first radio interface technology.

24. The system according to claim 23, wherein the logical channel set comprises a first logical channel subset and a second logical channel subset, a $1^{st}$ radio interface technology of the first logical channel subset is the first radio interface technology, and a $2^{nd}$ radio interface technology of the second logical channel subset is the first radio interface technology; and wherein the terminal is further configured to map, based on a priority and a prioritized bit rate that are of each logical channel in the first logical channel subset and corresponding to the first radio interface technology, to-be-sent data on the each logical channel onto the uplink resource corresponding to the first radio interface technology.

25. The system according to claim 24, wherein the terminal is further configured to:

map, based on a priority that is of each logical channel on which remaining to-be-sent data exists in the first logical channel subset and corresponding to the first radio interface technology, the remaining to-be-sent data on the each logical channel onto the uplink resource corresponding to the first radio interface technology; and map, based on a priority and a prioritized bit rate that are of each logical channel in the second logical channel subset and corresponding to the first radio interface technology, to-be-sent data on the each logical channel onto the uplink resource corresponding to the first radio interface technology.

* * * * *